Nov. 27, 1934.    G. C. PIERCE    1,981,877
METHOD OF AND MATERIAL FOR FILTRATION
Filed June 13, 1932
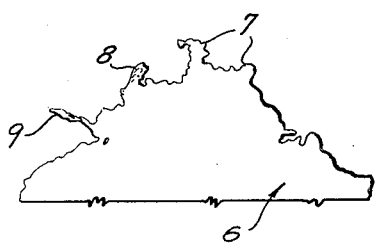
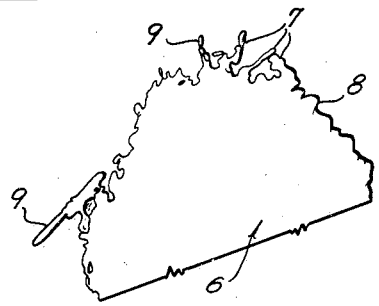
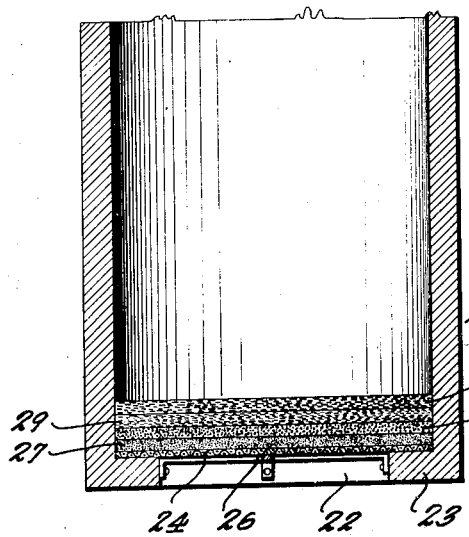
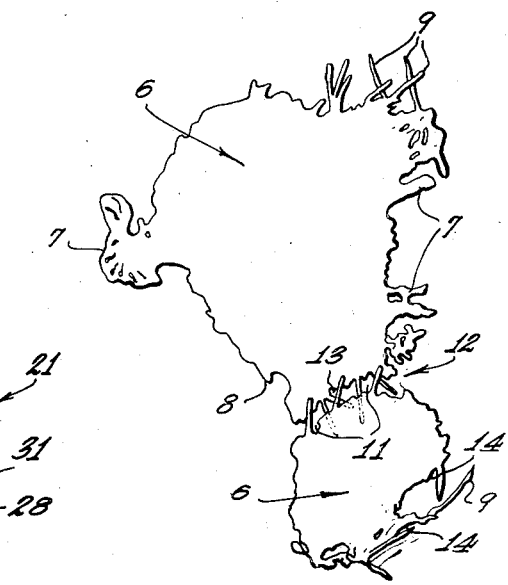
INVENTOR
GUY C. PIERCE
BY
Stuart N. Maule
ATTORNEY

UNITED STATES PATENT OFFICE 1,981,877

METHOD OF AND MATERIAL FOR FILTRATION

Guy C. Pierce, Los Angeles, Calif., assignor to Ella L. Pierce, Los Angeles, Calif.

Application June 13, 1932, Serial No. 616,960

13 Claims. (Cl. 210—203)

This invention relates to the art of filtration, and more particularly to filters of the type which employ diatomaceous earth, either alone or in combination with other materials, as a filtering material.

Diatomaceous earth has been used previously as a filtering medium; but it has practically always been used in a highly disintegrated state, i. e., it has been broken down and pulverized to a substantially impalpable powder. In fact, it is common practice in the construction of filters using diatomaceous earth, to specify that not more than 5% or 6% shall be retained upon a 200 mesh screen. While a filter employing such extremely finely comminuted material is possessed of a certain degree of filtering capabilities, it has been found in all instances that the rate of flow through the filter bed is so slow as to make the cost of filtering almost prohibitively expensive. It is an object of the present invention, therefore, to provide a filtering medium composed of diatomaceous earth, used either alone or in combination with other materials such as decolorizing clays, which is highly efficient with respect to the removal of suspended matter in the fluid being filtered and which, furthermore, permits of a greatly increased rate of flow as compared with diatomaceous earth filters now commonly employed.

A more detailed object is to provide a filtering medium composed of diatomaceous earth disintegrated only to such a degree of fineness that it is composed of particles varying in size from No. 30 mesh to No. 180 mesh, with only a small percentage of the material reduced to an impalpable powder.

A further object in this connection is to utilize as a filtering medium diatomaceous earth disintegrated to the particle sizes specified hereinabove, wherein the individual particles are substantially rigid bodies of very irregular configuration, which bodies carry a profusion of diatomic structures of microscopic size protruding from the surfaces thereof.

Another object is to provide a filtering device which employs the hereinabove described filtering medium as one of the operating elements thereof.

Another object is to provide a novel and highly efficient method of filtering, wherein a filter cake or bed is built up through the depositing of a so-called "filter-aid" upon the filter pad, the first deposit being composed of the finest graded sizes of particles of diatomaceous earth having protruding diatomic structures as mentioned hereinabove, and larger and larger particles subsequently being deposited thereupon, the result being that the ultimate filter cake is composed of particles of diatomaceous earth of gradually increasing size from the filter pad to the last deposited portion of the cake. This results in the extreme porosity of the filter cake, permitting of its continued use until it is several times thicker than could heretofore be used successfully, and thereby greatly increasing the period of time during which the filtering process can continuously be carried on without having to take down the filter press and remove the accumulated filter cake.

The invention possesses other objects and valuable features, some of which, with the foregoing, will be set forth in the following description of the preferred form of the invention. It is to be understood that I do not limit myself to the specific disclosure made by the said disclosure, as I may adopt variations of the preferred form within the scope of my invention as set forth in the claims.

Referring to the drawing:

Figure 1 is a plan view, enlarged to 300 diameters, of a portion of a particle of diatomaceous earth adapted for use in a filter in accordance with the present invention. The drawing is an actual copy of a photomicrograph of a particle of such size that it passed through a 40 mesh screen but was retained upon a 50 mesh screen, and shows the irregular configuration of the rigid body portion of the particle and some of the diatomic structures protruding from the rigid body. A portion of the figure is broken away to reduce its size.

Figure 2 is a view similar to Figure 1, also enlarged to 300 diameters and showing a portion of a particle of diatomite which passed through a 60 mesh screen and was retained upon an 80 mesh screen.

Figure 3 is a plan view also enlarged 300 diameters of a group of particles which passed through a 100 mesh screen and were retained upon a 150 mesh screen.

Figure 4 is a diagrammatic view in vertical section of a gravity filter constructed in accordance with the present invention and showing one manner of arranging graded particle sizes of diatomaceous earth in distinct layers.

In terms of broad inclusion, the present invention contemplates the provision of a novel filtering medium and method of using this material in carrying out the filtration process. The material to which reference has been made comprises graded sizes of diatomaceous earth of suitable size to afford the most efficient filtration, these particles being sharply defined, irregularly shaped rigid bodies and having a profusion of protruding pieces of the diatomic structure, which, of course, are of such minute size that they can be discerned only by the aid of a relatively high-powered microscope. One method of utilizing this medium in carrying out the filtering process comprises building up a filter cake, in the event that pressure filtration is being resorted to, composed of these graded sizes of diatomaceous earth particles having protruding diatomic structures, and wherein the particles are so arranged that the most finely comminuted particles are proximal to the filter pad and gradually increase in size as the distance from the filter pad increases. In the event that gravity filtration is being performed, the method of the present invention comprises building up a filter bed in substantially the same manner, although the method whereby the filter bed is built up differs, as will be explained in greater detail hereinbelow.

Describing my invention more specifically, I have provided a novel method of filtering and a novel filtering medium adapted for use in carrying out the process of filtration. This medium, as indicated hereinabove, comprises diatomaceous earth disintegrated or comminuted to certain definite particle sizes, the sizes preferred being from approximately 30 mesh to 180 or 200 mesh. Moreover, even though the particles are of such minute size, each is a substantially rigid body of definite and very irregular configuration and carries upon its surface a profusion of the diatomic structures which assist in the identification of the particular class of diatomite to which it belongs, these structures protruding outwards from the surface of the rigid body. These structures are the remaining silicified skeletons of the walls of the cells, or frustules, which persist after the death of the original diatomes, and the rigid bodies of the particles are themselves composed either largely or entirely of masses of these silicified skeletons which have in past times been subjected to tremendous geologic pressures forcing the skeletons into intimate contact so as to present a material of a much greater density than could be produced by endeavoring to compact such silicified material by any available mechanical pressures. This density, however, is very slight, owing to the delicate, lacey nature of the skeletons themselves as clearly revealed by microscopic examination. Hence, a mass of even the most dense diatomite is of a very porous and absorbent nature, this being one of the principal characteristics of diatomaceous earth. Nevertheless, the density of the rigid bodies which I employ corresponds to that of the diatomite as it occurs in nature, and accordingly is much greater than can be attained by any mechanical or chemical process and as that which is now in use and which entails re-assembling impalpably small particles and cementing them together into clinker-like bodies by means of a salt glaze or the like. In my product, the bond between the several diatomic strutcures of each small particle, instead of being artificial, is created geologically, and is, therefore, much stronger than in the case of the mechanically re-assembled clinkers. Moreover, mine are not subject to falling apart when in use, through dissolving of the bond which holds the bodies together, as are those held together by a salt glaze.

As is well known, diatomaceous earth is almost excessively frangible, so much so that all the attempts to disintegrate or comminute it have resulted in reducing all, or at least the major portion, of the material to an impalpable powder. In fact, whereas diatomaceous earth has been used previously as filtering medium, it has always been used in this impalpable form, the specifications for the filtering medium always containing a requirement to the general effect that not more than five per cent. or six per cent. shall be retained upon a 200 mesh screen. It is true that such material has a certain degree of filtering capability, owing to its extreme fineness, but it is this same excessive degree of fineness that causes the impalpably fine material to have a very great tendency to become packed and accordingly altogether impervious to the passage of liquids therethrough. Moreover the methods and apparatus previously used in disintegrating the material have been of such a nature that substantially all protruding particles of the diatomic structures have been broken off and/or completely destroyed, leaving the rigid bodies devoid of the previously existing characteristics thereof which would have been of the greatest benefit in carrying out the filtering process had they not been so broken off and/or destroyed.

It has been recognized in certain instances that diatomaceous earth disintegrated to such a degree as to produce a substantially impalpable powder had the disadvantageous tendency to pack when subjected to pressure, thus seriously interfering with or stopping completely the flow of liquid therethrough. In some such cases the attempt has been made to reassemble the impalpably fine particles by treating them with common salt or soda ash or other suitable chemical, and then heating to such a high temperature that a glaze is produced upon their surfaces, causing the extremely fine particles to cling together as they cool, and thereby forming miniature clinkers which are introduced into various devices by air streams of high velocity for the purpose of breaking up these clinkers. It is impossible, however, in this second disintegration, to control the particle sizes of the ultimate product, nor can the different mesh sizes be separated satisfactorily, because of the fact that great difficulty is encountered in screening material manufactured in this manner, as is well known to anyone skilled in the art. While the impalpably fine particles are removed by means of air streams, no attempt is made to separate and classify the remaining particle sizes.

It has been found, however, that such methods increase the percentage of the impalpable sizes unsuitable for practical filtering purposes and it is readily apparent that such treatment results in breaking off and/or destroying absolutely all of the superimposed particles protruding from the artificial clinkers thus produced.

This tendency of the material to disintegrate to an impalpable powder and for the protruding structures to be broken off is true of all known species of diatomite and is particularly pronounced in the case of those species which originated in fresh or brackish water. Presumably it is due to the exceedingly lacey structure of the fossilized diatome skeletons and to the low crushing and tensile strength of the silicious material of which they are composed.

However, I have made it possible to disintegrate diatomaceous earth to any desired lump or screen size, reducing only a very small proportion thereof to an impalpable powder, and to do so in such a manner that the particles thus produced carry a profusion of diatomic structures. The method and apparatus which I have developed for performing this function are disclosed in my co-pending application Serial No. 495,905, filed November 5, 1930, and in application Serial Number 512,780, filed February 2, 1931, of which this application is a continuation in part. It should be understood, however, that I do not wish to be limited in the enjoyment of the present invention to the use of this particular method of and/or apparatus for disintegration.

Figures 1 to 3 inclusive illustrate segregated particles of different species of diatomite, disintegrated by means of the method and apparatus to which reference has been made and may be considered as representative of the particles of decomposed diatomaceous earth making up a mass of my improved material as used in filtration. These figures are copies of actual photomicrographs, the scale of enlargement being 300 diameters and have been made to reproduce the actual appearance of the minute particles as viewed in the microscope as closely as the limitations of drafting permit. It should be borne in mind, however, that these views represent only profile views of the particles, inasmuch as those surfaces of the particles which are disposed toward and away from the objective of the microscope are invisible and only the peripheral configuration is revealed. It can readily be appreciated, therefore, that a much larger number of projecting particles are actually present upon each body, than are illustrated.

As Figures 1 to 3 inclusive clearly illustrate, each particle, which in reality is of minute size, comprises a body portion 6, presumably made up of a compacted mass of diatomaceous structures, and a plurality of protruding fragments 7 of the diatomic structures. In many instances, the protruding fragments 7 are made up merely of a protruding portion of the body 6, as illustrated at 8, these protrusions 8 being of no definite shape or size; whereas in other instances, the protruding fragment is a single one of the fossilized skeletons of the frustule of the original diatome, as indicated at 9. These protrusions 9 are of certain definite shape and size, and can be recognized by those familiar with the different species of diatomite, and thereby assist in the identification of the species being examined.

I partially attribute my success in disintegrating diatomaceous earth to the desired mesh size, to the fact that the material can be handled efficiently and expeditiously by the apparatus and according to the method hereinabove referred to, in a relatively moist condition, and without having first to calcine the material, although dry material can also be handled satisfactorily and either before or after being calcined. It is well known that calcination of any silicious material increases its inherent brittleness; and I have found that the natural moisture content of diatomite as mined lends a certain degree of yieldability thereto, thereby reducing the hazard of rupturing particles which protrude from the rigid bodies 6 during the process of disintegration. After the diatomite has been disintegrated to the desired particle sizes, it may be calcined, or it may be used as a filtering medium without calcining, according to the chemical and physical characteristics of the material which is to be filtered. It should be understood that the method and apparatus hereinabove referred to have been used successfully in the disintegration of diatomite that has been calcined previously, and that accordingly I do not wish to be limited to the use thereof in connection with only un-calcined diatomite, although I am able to retain a greater quantity of the protruding diatomic structures when un-calcined diatomite which retains its natural moisture content, is being treated.

I have attained considerable success in reclaiming diatomite which has previously been used in a filter bed or a filter cake. This is accomplished by calcining the diatomite to remove the impurities which have accumulated therein. That I am enabled to perform this step which has previously been considered impossible, is due partially to the fact that I am employing defined mesh sizes of diatomite, instead of an impalpable powder, and also to the fact that the particles are not in the form of clinkers which in all probability would be destroyed upon the the application thereto of sufficient heat to calcine this material.

The diatomaceous earth which has previously been utilized in the form of a substantially impalpable powder, has been subject to the tendency to pack, as stated hereinabove, due to the extreme fineness of the particles and to the absence of any protruding structures, both of which features result in the fact that the voids between the particles are almost infinitely small, particularly when a mass composed of such particles is subjected to pressure. The mere fact that I have been enabled to produce diatomaceous earth disintegrated to particles which in the aggregate are sufficiently small to produce any filtering effect, and still very materially larger than those comprising the major portion of the diatomaceous earth previously used for filtration, accounts for a very material increase in the percentage of voids in a mass of the filtering material prepared in accordance with my invention; and, as a result of the retention of the structures 8 and 9 which protrude from the surfaces of the bodies 6 of the particles of disintegrated diatomaceous earth, the particles are held separated from each other when a number of the particles are pressed together, even when subjected to such high pressures as are commonly employed in commercial filtering, thereby further increasing the porosity of my improved filtering medium. The projections 8 and 9 serve as abutments, i. e., those carried by and anchored in one particle engage another of the particles, holding the two separated, and thereby increasing the size of the interstices or voids between the particles, as indicated at 11 upon Figure 3. This increase in porosity accounts for the greatly increased rate of flow of liquids through a filtering medium embodying the principles of the present invention, as compared with that which can be attained when using diatomite prepared along more conventional lines.

However, this increase in the rate of flow is not accompanied by a decrease in the efficiency of the material with respect to its capability of removing exceedingly fine particles of suspended matter from a liquid being filtered, as might at first be expected. Rather is its filtering efficiency increased, as has been proved by actual test, both in the laboratory and in commercial practice. I attribute this characteristic of my improved filtering medium to the interlacing of the protruding structures 9 carried by one body or particle 6, with structures 9 which protrude from a body or particle 6 disposed thereadjacent within the filter bed or filter cake. By this inter-lacing, a super-screen such as that indicated at 12, is produced, inasmuch as the voids 11 between particles, which voids are themselves exceedingly small, are cut up by the spicules or diatomic structures 9, into a multiplicity of much smaller voids or interstices, such as those indicated at 13 upon Figure 3. In this manner, innumerable exceedingly small voids 13 are provided in a filter bed or filter cake constructed in acordance with my invention, these voids 13 being in many instances actually as small as those which prevail in diatomite disintegrated to a substantially impalpable powder and subjected to pressure, but without the objectionable tendency to pack and thus prevent a reasonably rapid rate of flow through the material, as in the case of this excessively finely comminuted material, the individual particles of which have had their protruding diatomic structures broken.

By way of illustration of this ability of my filter to remove exceedingly fine particles of suspended matter, it may be stated that through its use I have been enabled to remove the vegetable coloring matter which is used in certain brands of gasoline as an identifying feature, and in removing vermillion ink from water, these being tests of a filtering medium which it has not, within my knowledge, been possible to perform before.

It will be observed by reference to Figure 3, that the spicules protrude from the body 6 in many different directions, thereby defining many acute angles such as that indicated at 14, so that even though a spicule does not intermesh with any other, it may provide a pocket at its juncture with its supporting body, within which particles suspended in the liquid being filtered may become lodged. This further enhances the filtering efficiency of my filtering medium, as may be readily understood.

In the instance of some species of diatomaceous earth which have been disintegrated according to the method and by means of the apparatus of my invention, the diatomic structures which protrude from the particles are so extremely small and so numerous that even when examined under a microscope capable of enlarging to 1000 or 1100 diameters, they are revealed merely as a dense fuzz. It can readily be appreciated that such material is capable of intercepting even the finest and most elusive solid particles held in suspension in a liquid being filtered through a mass of such filtering medium, and that the particles thus intercepted will be retained by the fuzz by becoming entrapped therein, whereas the liquid will be permitted to flow on through, divested of the solid particles previously held in suspension therein.

Another important feature of the protruding and inter-meshing diatomic structures is their capability of intercepting the extremely fine particles of decolorizing clays which it is frequently desired to utilize in conjunction with filtering medium, so as to bleach or otherwise alter the color of a liquid simultaneously with the filtration thereof. Although several methods of using these clays may be resorted to, I prefer to locate the clay within a substantially definite stratum within the filter bed or cake, this stratum of clay preferably being composed of graded sizes of clay particles, the smallest particles being at the bottom of the stratum and the particles being of gradually increasing size as the distance from the bottom of the stratum increases.

With reference to the increased rate of flow which my improved filtering medium permits, it should be pointed out that in certain tests performed under actual commercial operating conditions, the filtration of oil, as one of the steps in the refinement thereof, was performed by means of my filtering medium in less than one-fifth the time, even though the same or a better degree of purification was attained, as compared with the time required and degree of purification, respectively, when the commercial type of diatomaceous earth filter was employed.

As a further example of the superiority of my product, it has been common practice in the refinement of sugar, to reduce the viscosity of the syrup both by diluting it with a large percentage of water and by raising the temperature, thereby increasing the fluidity of the syrup sufficiently to permit it to be forced through a pressure filter. The dilution with water increases the cost of refinement, inasmuch as the water must, after filtration, be removed by evaporation; and the heating seriously interferes with the filtration because it so reduces the size of the suspended globules of gums which the filtration is intended to remove, that the removal thereof is even more difficult.

However, by utilizing my improved filtering medium, having the greatly increased porosity hereinabove explained, the necessity for excessive dilution and excessive heating is dispensed with by using the appropriate graded particle sizes of filtering medium, whereby the desired rate of flow may be obtained, even though the relatively large gum globules are present in the liquid, due to its lower temperature. Nevertheless, these globules and other impurities which it is desired to remove, become lodged upon the diatomic structures 8 and 9 which protrude from the rigid bodies 6 of the particles, thereby being retained within the filter cake while the thus purified liquid is permitted to pass on through.

The preferred method of employing my improved filtering medium may readily be understood by reference to Figure 4. A suitable container 21 having an opening 22 in the bottom 23 has a suitable pad 24 of felt, cloth, or other porous material having a suitable degree of physical strength, disposed therein so as to extend across the opening 22. Preferably the pad is supported upon a grill work or spider 26, and upon the upper surface of this pad is spread a layer 27 of the finest of the graded sizes of the comminuted diatomaceous earth which it is necessary to employ in order to perform the particular filtration process involved. For example, the layer 27 may be composed of 150 mesh particle size. Upon the top of this layer 27, another layer 28 is spread, this being composed of larger sized particles, say 100 mesh, and in the same manner, additional layers 29, 31, etc., may be spread in superimposed relation, each succeeding layer being composed of larger sizes than those of the layer immediately therebelow. This arrangement of the filtering medium in strata of graded sizes of particles, with the largest particles at the top, causes only the largest of the particles suspended within the liquid being filtered to accumulate at the uppermost, or inlet, surface of the filter bed, and the smaller suspended particles to travel into the filter until they encounter a layer composed of sufficiently small particles of the filtering medium to arrest further passage of those particles therethrough. In this manner, the tendency for the filter to become clogged is greatly reduced, inasmuch as the material being removed from the liquid is distributed substantially throughout the entire filter bed instead of being permitted to accumulate in the form of a slime at or immediately adjacent the inlet end of the bed, such a slime of course tending to clog the pores of the bed and thus hinder or prevent further flow therethrough.

Substantially the same result may be attained in a pressure filter, wherein the mass of filtering material, instead of being arranged in operative position prior to commencement of flow of the liquid therethrough, is built up in the form of a filter cake by the depositing of a so-called "filter-aid", which is held in suspension within the liquid to be filtered. When this method of filtration is resorted to, a suitable pad of foraminous material is placed within the filter press so as to extend across the discharge opening thereof, preferably being supported upon a suitable grill or the like. Then I prefer to pre-coat the pad with a layer of diatomaceous earth which has been disintegrated according to my method hereinabove referred to, to the smallest particle size which is to be used for the particular filtration process for which preparation is being made. A quantity of the liquid to be filtered is then supplied to the press, and in suspension within this liquid is a predetermined quantity of filter-aid comprising my improved form of disintegrated diatomaceous earth, the size of the particles of which is either the same as or the next larger than those composing the pre-coating of the pad. As the liquid is forced through the pre-coating, the filter-aid is deposited upon the pre-coating in the form of an evenly distributed layer, throughout the entire mass of which are distributed the particles of impurities of the liquid, for the removal of which the filtration is being carried on. This step in the filtration process is brought to a stop before a sufficient quantity of the filter-aid and particles of impurities have accumulated to interfere seriously with the rate of flow. Then a quantity of the liquid to be filtered having the next larger particle size of the filter aid is supplied to the filter press, the result being that the next layer to be deposited upon that which already has accumulated is composed of the larger sized particles. This process is continued, gradually building up a filter cake which is stratified, the several layers or strata being composed of graded particle sizes of the filtering medium, each layer being composed of but one size, and that size being larger than the particles of the layers lying between that layer and the discharge end of the filter, and smaller than the particles of the layers between that layer and the inlet end of the filter.

Heretofore it has been customary to employ a "filter-aid", but without any attention having been paid to supplying the material to the liquid to be filtered in graded sizes, and which are gradually increased as the filtering process continues. A disadvantage of this old method is that within a limited time, excessive pressure is necessary to maintain a uniform rate of flow through the filter cake; whereas when graded sizes of filter aid are used as hereinabove described, the larger particles of impurities become lodged upon the portion of the filter cake first encountered by the liquid, the smaller particles being permitted to move through the cake until they encounter a layer of the filtering medium, the particles, and consequently the voids, of which are too small to permit those particularly impurity particles to move further. Thus a more complete distribution of the impurities is obtained, making it possible to continue the filtration until the accumulated filter cake is of a much greater thickness, whereas according to the old method a filter cake of a very limited thickness would usually offer such a high resistance to flow of liquid therethrough that its further use would be impracticable. Hence the frequency with which the filter cake must be removed is prolonged by my method, which obviously is of considerable importance in reducing the cost of commercial filtration.

Another distinct advantage of my improved method of filtering as hereinabove disclosed is that it makes it possible to predetermine the degree of clarity and the rate of flow to be obtained by a given filter. In other words, after a chemist has determined by test in the laboratory the degree of clarity desired, the appropriate mesh sizes of disintegrated diatomite may be selected and disposed in proper quantity and arrangement by depositing in defined layers so as to obtain the desired result with respect both to clarity and to rate of flow.

I claim:

1. As a filtering medium, diatomaceous earth in particle sizes between 30 and 180 mesh and comprising substantially rigid bodies and diatomic structures protruding from said rigid bodies.

2. As a filtering medium, diatomaceous earth in particle sizes of predetermined magnitude and comprising substantially rigid bodies and diatomic structures protruding from said rigid bodies.

3. As a filtering medium, diatomaceous earth disintegrated to particle sizes between 30 and 180 mesh and comprising substantially rigid bodies and diatomic structures protruding from said rigid bodies and forming abutments holding said rigid bodies separated, thereby increasing the size of the voids between said bodies and thus increasing the porosity of a mass of said disintegrated diatomaceous earth by reducing the tendency thereof to become packed under pressure.

4. As a filtering medium, diatomaceous earth disintegrated to particle sizes between 30 and 180 mesh and comprising substantially rigid bodies and diatomic structures protruding from said rigid bodies, the protruding diatomic structures of adjacent bodies being disposed in interlaced relation, thereby providing a superscreen within the interstices between said rigid bodies.

5. As a filtering medium, diatomaceous earth disintegrated to particle sizes between 30 and 180 mesh and comprising substantially rigid, irregularly shaped bodies and diatomic structures protruding from said rigid bodies.

6. As a filtering medium, diatomaceous earth disintegrated to particle sizes between 30 and 180 mesh and comprising substantially rigid bodies and diatomic structures protruding from said rigid bodies, the protruding diatomic structures of adjacent bodies being disposed in interlaced relation, thereby providing a superscreen within the interstices between said rigid bodies, and particles of decolorizing clay lodged upon said superscreen.

7. As a filtering medium, diatomaceous earth disintegrated to particle sides between 30 and 180 mesh and comprising substantially rigid bodies and diatomic structures protruding from said rigid bodies, the protruding diatomic structures of adjacent bodies being disposed in interlaced relation, thereby providing a superscreen within the interstices between said rigid bodies, and particles of decolorizing clay lodged upon said superscreen at a predetermined location within the mass of said filtering medium.

8. As a filtering medium, calcined diatomaceous earth in particle sizes between 30 and 180 mesh and comprising substantially rigid bodies and diatomic structures protruding from said rigid bodies.

9. As a filtering medium, uncalcined diatomaceous earth in particle sizes between 30 and 180 mesh and comprising substantially rigid bodies and diatomic structures protruding from said rigid bodies.

10. A filter bed comprising diatomaceous earth disintegrated to defined particle sizes between 30 and 180 mesh and comprising substantially rigid bodies and diatomic structures protruding from said rigid bodies and forming abutments holding said rigid bodies separated, the diatomic structures protruding from adjacent bodies being disposed in interlaced relation to provide a superscreen within the interstices between said rigid bodies, said diatomaceous earth being graded with respect to particle sizes and arranged in layers, the layer proximal to the discharge end of said filter bed being composed of the smallest size particles and the succeeding layers to and including that proximal to the inlet end of said filter bed being composed of successively larger particles.

11. As a filtering medium, diatomaceous earth in particle sizes between 30 and 180 mesh and comprising substantially rigid bodies and diatomic structures protruding from said rigid bodies, each of said rigid bodies comprising a mass of diatomic structures united by geologic action and with the geologically established bond between the several structures thereof undisturbed.

12. As a filtering medium, diatomaceous earth in particle sizes of predetermined magnitude and comprising substantially rigid bodies and diatomic structures protruding from said rigid bodies, each of said rigid bodies comprising a mass of diatomic structures united by geologic action and with the geologically established bond between the several structures thereof undisturbed.

13. As a filtering medium, diatomaceous earth in particle sizes of predetermined magnitude and comprising substantially rigid bodies and diatomic structures protruding from said rigid bodies, each of said rigid bodies comprising a mass of diatomic structures whose density corresponds to that of the diatomaceous earth as it occurs in nature.

GUY C. PIERCE.